United States Patent
Randa et al.

(10) Patent No.: US 9,566,653 B2
(45) Date of Patent: Feb. 14, 2017

(54) PIPE SLITTER

(71) Applicant: Earth Tool Company LLC, Oconomowoc, WI (US)

(72) Inventors: Mark D. Randa, Summit, WI (US); Robert F. Crane, Oconomowoc, WI (US); Walter George Thompson, Janesville, WI (US)

(73) Assignee: Earth Tool Company LLC, Lake Mills, WI (US)

( * ) Notice: Subject to any disclaimer, the term of this patent is extended or adjusted under 35 U.S.C. 154(b) by 67 days.

(21) Appl. No.: 14/509,859

(22) Filed: Oct. 8, 2014

(65) Prior Publication Data

US 2015/0098765 A1   Apr. 9, 2015

Related U.S. Application Data

(60) Provisional application No. 61/888,061, filed on Oct. 8, 2013.

(51) Int. Cl.
| | |
|---|---|
| *F16L 1/028* | (2006.01) |
| *B23D 21/14* | (2006.01) |
| *F16L 55/165* | (2006.01) |
| *F16L 55/18* | (2006.01) |
| *B23D 21/02* | (2006.01) |
| *E03F 3/06* | (2006.01) |

(52) U.S. Cl.
CPC ............. *B23D 21/14* (2013.01); *B23D 21/02* (2013.01); *F16L 55/1658* (2013.01); *F16L 55/18* (2013.01); *E03F 3/06* (2013.01)

(58) Field of Classification Search
CPC .......... B23D 21/02; B23D 21/14; F16L 55/18; F16L 55/1658; E03F 3/06
See application file for complete search history.

(56) References Cited

U.S. PATENT DOCUMENTS

| | | | | |
|---|---|---|---|---|
| 4,507,019 | A * | 3/1985 | Thompson | E21B 7/046 138/97 |
| 5,098,225 | A * | 3/1992 | Rockower | B23D 21/02 138/97 |
| 5,651,639 | A * | 7/1997 | Wentworth | F16L 55/1657 405/184 |
| 7,086,808 | B2 * | 8/2006 | Wentworth | E02F 5/10 405/184 |
| 2001/0018007 | A1 * | 8/2001 | Puttmann | E21B 7/30 405/184.3 |
| 2002/0081154 | A1 * | 6/2002 | Herrick | F16L 55/1658 405/184 |
| 2002/0114671 | A1 * | 8/2002 | Wentworth | F16L 55/1658 405/184.3 |

(Continued)

*Primary Examiner* — Benjamin Fiorello
(74) *Attorney, Agent, or Firm* — Tomlinson McKinstry, P.C.

(57) ABSTRACT

A pipe expander assembly for replacing an existing pipe with a new pipe. The expander assembly has a slitter disposed about a wire rope and abutting an expander at a spherical joint. The expander comprises a cone to expand a slit pipe and is internally connected to the wire rope by jaws that expand and contract about the wire rope due to threading of a jam nut into the cone. A pipe puller is connected to the back of the expander at a clevis and is adapted for connection to a new pipe, either through a jaw system, an adaptor, or fusion to the pipe.

21 Claims, 5 Drawing Sheets

(56) References Cited

U.S. PATENT DOCUMENTS

| | | | | |
|---|---|---|---|---|
| 2004/0218982 A1* | 11/2004 | Wentworth | ............... | E21B 7/30 |
| | | | | 405/184.3 |
| 2007/0048091 A1* | 3/2007 | Tjader | ................. | F16L 55/1658 |
| | | | | 405/184.3 |
| 2011/0079469 A1* | 4/2011 | Tjader | ................. | F16L 55/1658 |
| | | | | 184/14 |
| 2011/0081205 A1* | 4/2011 | Tjader | ..................... | F16L 55/18 |
| | | | | 405/184.3 |
| 2011/0081206 A1* | 4/2011 | Tjader | ................. | F16L 55/1658 |
| | | | | 405/184.3 |
| 2011/0206462 A1* | 8/2011 | Sutton | ................. | F16L 55/1658 |
| | | | | 405/184.3 |
| 2013/0219670 A1* | 8/2013 | Tjader | ..................... | E21B 7/205 |
| | | | | 24/115 R |
| 2014/0241812 A1* | 8/2014 | Herrick | ................. | H02G 1/081 |
| | | | | 405/184 |

\* cited by examiner

PIPE SLITTER

CROSS REFERENCE TO RELATED APPLICATION

This application claims the benefit of provisional patent application Ser. No. 61/888,061 filed on Oct. 8, 2013, the entire contents of which are incorporated herein by reference.

FIELD

The present invention relates generally to the field of replacing existing utility lines, such as gas and water lines, through splitting and installing lines in the subsurface.

SUMMARY

The present invention is directed to an apparatus for expanding and replacing a pipe. The apparatus comprises a slitter, an expander, and a wire rope. The slitter comprises a blade. The expander comprises a tapered section having a first end and a second end. The cross-sectional area of the first end is less than the cross-sectional area of the second end. The first end abuts the slitter. A jam nut is connectable to the tapered section. The expander further comprises having a gripping surface disposed between the tapered section and the jam nut. The jaws are movable between a first position and a second position. The space within the gripping surface is less when the jaws are in the first position than when in the second position. A wire rope is disposed within the slitter and the tapered section. The wire rope is connected to the gripping surface when the jaws are in the first position and the wire rope is not connected to the gripping surface when the jaws are in the second position.

BACKGROUND

Pipe slitting is a process where an existing buried pipeline is separated longitudinally, expanded open circumferentially along with the surrounding soil and a new pipe is pulled in simultaneously as the slitting and expanding process is performed. Variations on the process include removal of the existing pipe prior to installation of the new (product) pipe; however most projects are performed with the slit host pipe remaining in the bore adjacent the product pipe.

A tensile structure such as a wire rope is pushed or fished through the host pipe and tooling capable of performing the combined slitting/pipe pulling process is attached to one end of the tensile pulling strand. A device capable of applying tension to the strand such as a hydraulic puller or even excavating equipment is coupled to the opposite end. A load is applied and the tooling is pulled along the path of the host pipe, through the ground.

There remains a need for quick attachment and removal mechanisms that satisfy the desire for an unobtrusive feature somewhere along the length of the tooling.

DESCRIPTION

Figure 1:
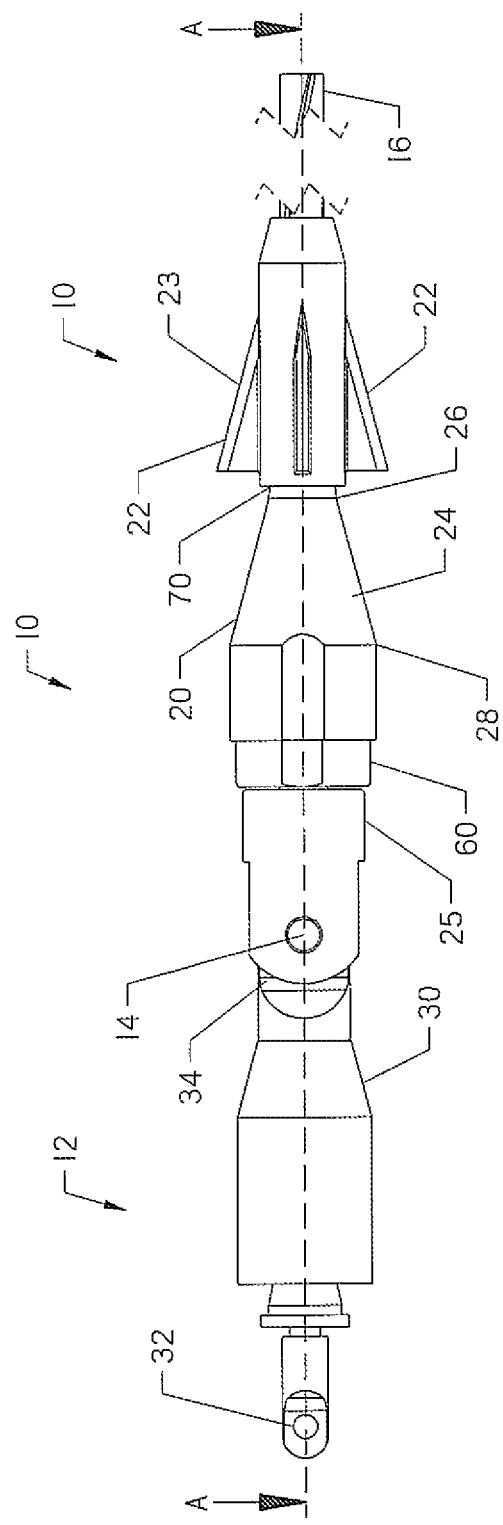
FIG. 1 is a side view of the pipe slitter and puller with a centered section line A-A

With reference now to the Figures in general and FIG. 1 in particular, shown therein is an apparatus for replacing a pipe, herein described as a pipe expander assembly 10. The pipe expander assembly 10 is attached at a first end to a pipe puller 12 by a connector 14. As shown, the connector 14 is a bolt. Other connectors 14 are considered, and one of ordinary skill in the art could additionally consider making the pipe puller 12 integral with the pipe expander 10. The pipe expander assembly 10 is attached at a second end to a tensile pulling member, or wire rope 16. The wire rope 16 is attached at a first end to the pipe expander assembly 10 and at a second end (not shown) to a pulling member (not shown) such as a cable winch. The pipe expander assembly 10 comprises a slitter 18 and an, expander 20. The slitter 18 comprises at least one blade 22. As shown, the slitter 18 comprises four blades 22. Each blade 22 comprises a honed edge 23 for slitting of a host pipe (not shown). The slitter 18 is positioned ahead of the expander 20 and is configured such that when placed within the host pipe, at least one blade 22 of the slitter will slit the host pipe wall.

Expander 20 comprises a tapered, or conic section 24, a jam nut 60, and a clevis 25. The conic section 24 increases in cross sectional area from front 26 to back 28. The back 28 of the conic section 24 is preferably of greater cross-sectional area than the cross-sectional area of the host pipe, such that the host pipe and surrounding soil are expanded by pulling the expander assembly 10 through. The clevis 25 is attached to the pipe puller 12 by the connector 14, which as shown is a threaded bolt 14. The clevis 25 may rotate relative to the conic section 24 of the expander 20. The jam nut 60 is rotationally connected to the clevis 25 and may be threaded into the conic section 24 as will be described in greater detail with reference to FIGS. 3-5.

The pipe puller 12 comprises a conic section 30 to reduce friction associated with pulling a trailing product pipe in a bore suffering from soil collapse. The pipe puller 12 further comprises an eyelet 32 which allows connection to a tensile string (not shown) and a towing eye 34 for connection to the connector 14 and the expander 20. One of skill in the art will appreciate that the tensile string allows compression of the product pipe through its length by tensioning the string between eyelet 32 and the trailing end of the product pipe, aiding in prevention of a tensile fracture in the product pipe.

Figure 2:
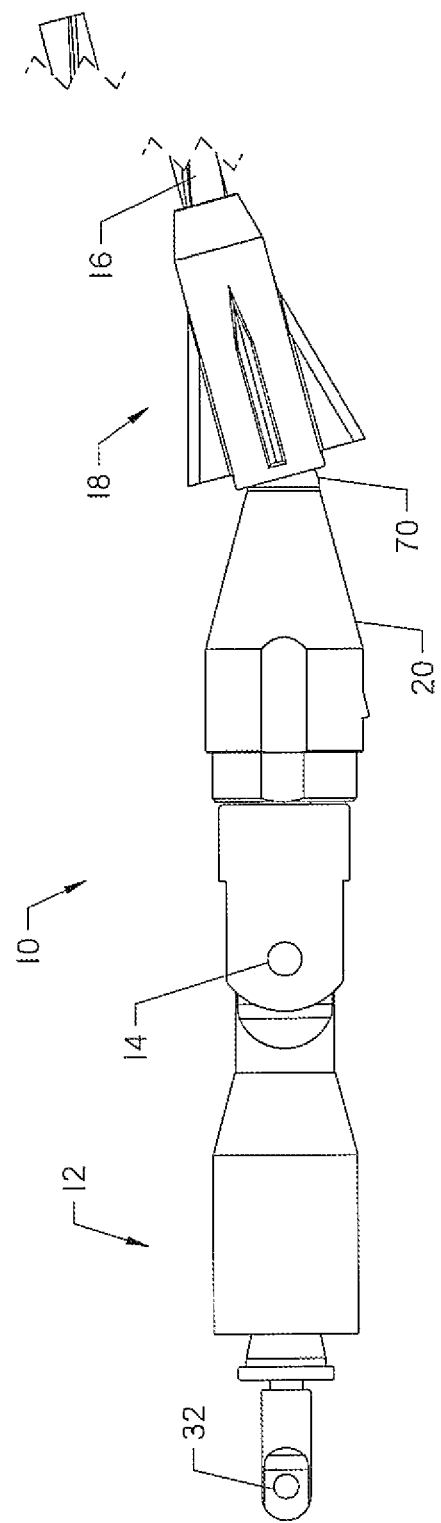
FIG. 2 is a pipe slitter and puller shown passing through a curving path of a host pipe.

As shown in FIG. 2, the slitter 18 and expander 20 may pivot relative to one another about a spherical joint 70, as host pipes may not always be straight. The slitter 18 is free to deflect angularly from the expander 20 and follow the path of a host pipe. The deflection between the slitter 18 and the expander 20 is effected by seating the slitter about the wire rope 16 without direct attachment to the wire rope or the expander 20. The expander 20 is internally attached to the wire rope 16 as will be described in further detail with reference to FIG. 3. In this way, the slitter 18 and expander 20 follow the path of the wire rope 16 without direct attachment between the two. This spherical joint 70 is shown in more detail in FIG. 3.

Figure 3:
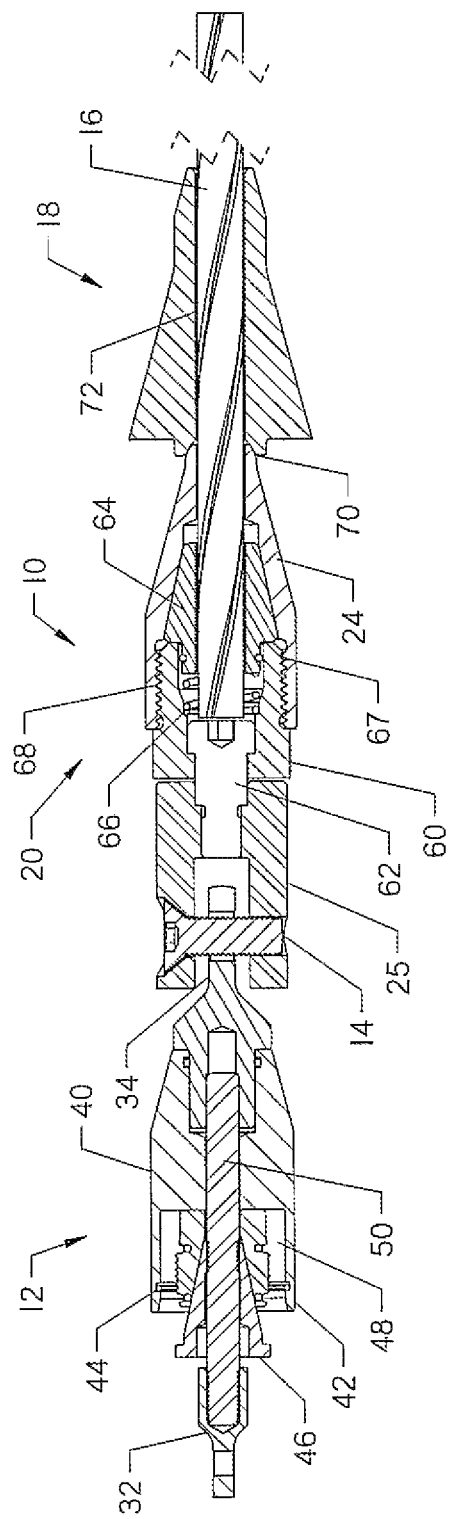
FIG. 3 is section A-A of FIG. 1 showing clamping of the device to a wire rope

With reference now to FIG. 3, shown therein is section A-A of FIG. 1. The pipe puller 12 further comprises a body 40, a sleeve 42, a set of puller jaws 44, a cone 46, an annulus 48 defined by the space between the jaws and the sleeve, and a rod 50. The rod 50 is mixedly attached to the eyelet 32 on a first end and the towing eye 34 on a second end. The rod 50 travels through the body 40 and is threadedly attached to the cone 46. The puller jaws 44 are disposed about the rod 50 within the annulus 48. As the cone 46 is moved along the rod 50 toward the second end of the rod, the puller jaws 44 expand outward within the annulus 48 toward the sleeve 42. Thus, rotation of the rod 50 while the cone 46 is rotationally fixed to the puller jaws 44 will cause the jaws to expand or contract, depending on the direction of thread and rotation. Further, pulling the rod 50 toward the expander 20 will similarly cause the puller jaws 44 to expand toward the sleeve 42.

Product pipe is attached to the pipe puller 12 by placing a product pipe within the annulus 48 and expanding the puller jaws 44 through use of the rod 50 as described above. Clamping force between the puller jaws 44 and sleeve 42 may hold the product pipe in place. As discussed above, a tensile force may be provided to a terminal end of the pipe through connection to a tensile member, such as a wire rope, at the eyelet 32. Alternatively, an adaptor (not shown) may be used to connect the pipe puller 12 to the product pipe, or the product pipe may be fused to the pipe puller 12.

The expander 20 further comprises a jam nut 60, a swivel bolt 62, a gripper, or expander jaws 64, and a spring 66. The swivel bolt 62 allows the clevis 25 to rotate relative to the jam nut 60 and conic section 24. Therefore, relative rotation between the product pipe (and therefore pipe puller 12) and wire rope 16 is accommodated. The expander jaws 64 are disposed inside the conic section 24 about the wire rope 16 and movable between a first position and a second position. In the first position, as shown in FIG. 3, the expander jaws 64 are engaged with the wire rope 16 such that the wire rope is connected to the expander jaws and the expander 20. In the second position, shown in more detail with reference to FIG. 5 below, the expander jaws 64 do not engage the wire rope 16, allowing the expander 20 to slide relative to the wire rope. The interior of the conic section 24 comprises threads 67 that mate with lands 68 on the exterior of the jam nut 60. Alternatively, jam nut 60 and the conic section 24 may connect through a bolted, fused, quick-attach or other known connection method.

As the jam nut 60 is threaded to the conic section 24, the expander jaws 64 are forced to grip the wire rope 16 and thus moved from the second position to the first position. The action of tightening jam nut 60 couples the expander assembly 20 to the wire rope 16. The spring 66 is disposed within jam nut 60 and places a load on expander jaws 64 to keep expander jaws confined within the interior of the conic section 24.

As shown, the slitter 18 comprises a channel 72 for the wire rope 16 to pass within. Preferably, the channel 72 is sized to the wire rope 16 such that movement of the slitter 18 relative to the wire rope 16 is limited. The slitter 18 is not directly attached to the wire rope 16, but is forced forward by the expander 20 at the spherical joint 70 when the wire rope pulls on the expander at the expander jaws 64. Thus, the slitter 18 has 360 degrees of angular deflection about the spherical joint 70.

Figure 4:
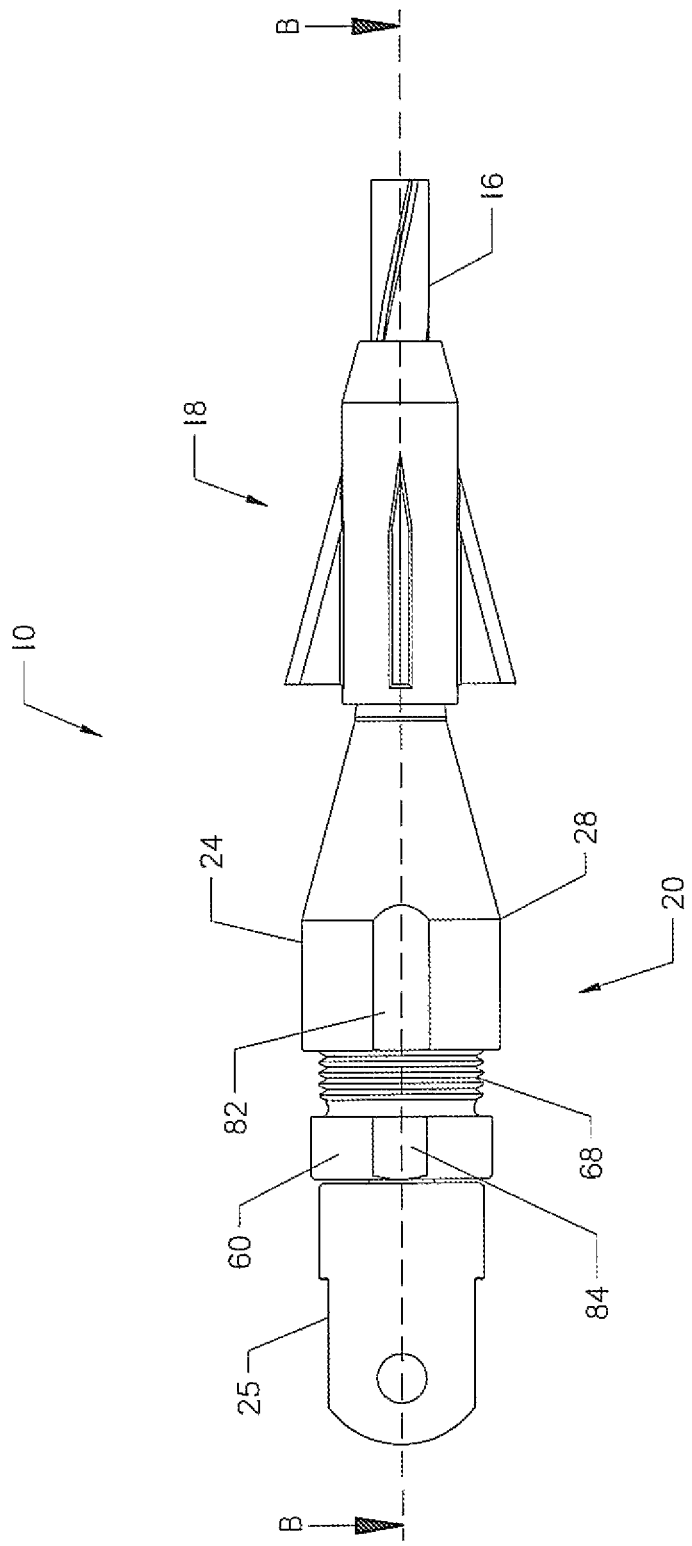
FIG. 4 is a side view of the pipe slitter and puller surrounding a wire rope in a disassembled condition and section line B-B along the centerline.

FIG. 4 is a side view of the pipe expander assembly 10 of FIGS. 1-3 with the pipe puller removed. In FIG. 4, the jam nut 60 has been backed out of the conic section 24, revealing the lands 68 and placing the expander jaws 64 (FIG. 5) in the second position. Attachment of the expander 20 to the wire rope 16 can thus be illustrated. The expander 20 comprises wrench flats 82, 84 on the back 28 of the conic section 24 and jam nut 60 respectively are used to tighten or loosen jam nut into or out of the conic section 24. To assemble shown components, first the slitter 18 is piloted over the wire rope 16 and slipped forward. Then expander assembly 20, with the jam nut 60 threaded out as shown is placed over the end of wire rope 16 with the expander jaws 64 (FIG. 5) in the second position.

Figure 5:
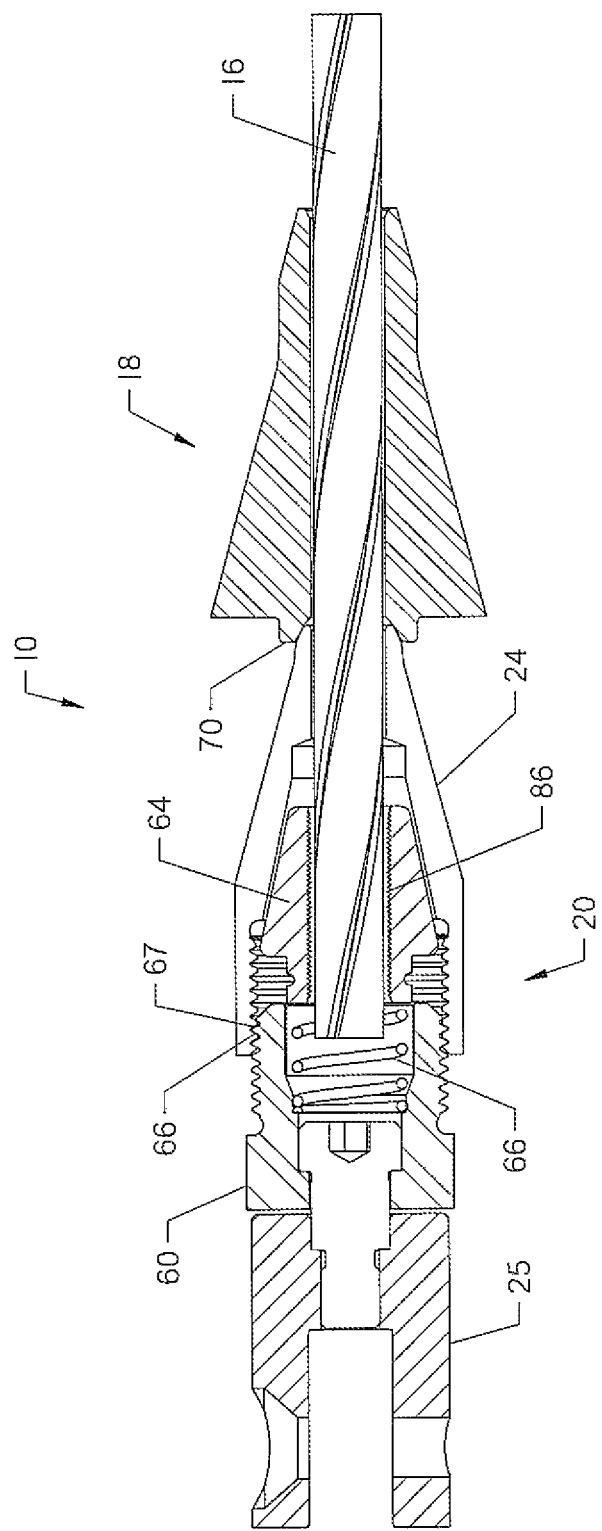
FIG. 5 is section B-B shown with the pipe slitter decoupled from a wire rope.

With reference now to FIG. 5, the expander jaws 64 comprise a gripping surface 86 for biting into surface of the wire rope 16. The gripping surface 86 may comprise serrations, teeth, or other known grippers. The gripping surface 86 engages with the wire rope 16 when the jam nut 60 is engaged such that the expander jaws are in the first position due to a reduction of the space disposed within the gripping surface. Conversely, as shown in FIG. 5, the gripping surface 86 will not bite into the surface of wire rope 16 when the jam nut is not engaged and the expander jaws 64 are in the second position. Therefore when the jaws 64 are in the second position, slitter assembly 18 and expander 20 will be free to slide off of wire rope 16.

In operation, the wire rope 16 is disposed through the existing pipe (not shown). The slitter 18 is placed onto the wire rope, followed by the conic section 24 of the expander 20. The expander jaws 64 are then moved from the second position to the first position by threading of the jam nut 60 into the conic section 24. The pipe puller 12 is attached to connector 14. A new pipe is optionally placed within the pipe puller as described above, if replacement of the existing pipe is desired. The wire rope 16 is then pulled through the existing pipe, causing the blades 22 of the slitter 18 to slit the pipe, the conic section 24 of the expander 20 to expand the pipe, and the new pipe to be pulled into place along substantially the same path as the existing, slit pipe. The new pipe is then removed from the pipe puller 12 when the wire rope is pulled all the way through the existing pipe.

One of ordinary skill in the art will appreciate that while the Figures show one configuration for the subject invention, modifications to the particular shape and organization of the pipe expander assembly 10 may be taken without departing from the spirit of the disclosed invention. For example, the slitter 18 may be integrally formed with the expander rather than abutting the expander at the cylindrical joint. Likewise, the pipe puller 12 may be integrally formed rather than connected at a clevis joint.

What is claimed is:
1. An apparatus comprising:
   a slitter comprising a blade;
   an expander comprising:
      a hollow contact section having a first end and a second end, wherein the cross-sectional area of the first end is less than the cross-sectional area of the second end, the first end abutting the slitter;
      a jam nut connectable to the contact section; and
      a gripper disposed between the contact section and the jam nut, movable between a gripping position and a non-gripping position;
   a pipe puller assembly attached at a first end to the expander proximate the jam nut and attachable at a second end to a replacement pipe;
   a clevis and bolt providing a pivoting connection between the pipe puller assembly and the expander; and
   a wire rope disposed within the slitter and the tapered section, wherein the wire rope is held by the gripper when the gripper is the gripping position and wherein the wire rope is not held by the gripper when the gripper is in the non-gripping position.

2. The apparatus of claim 1 wherein the gripper comprises jaws.

3. The apparatus of claim 1 wherein the gripper defines a smaller cross-sectional area when in the gripping position than when the gripper is in the non-gripping position.

4. The apparatus of claim 1 further comprising a cable winch attached to the wire rope.

5. The apparatus of claim 1 wherein the pipe puller assembly comprises:
a sleeve;
a rod disposed within the sleeve and rotationally movable relative to the sleeve;
a cone threadedly disposed about the rod; and
jaws disposed about the cone such that the jaws are movable between an expanded position and a retracted position by threaded movement of the cone along the rod.

6. The apparatus of claim 5 wherein the replacement pipe is attached to the pipe puller when the jaws are in the expanded position.

7. The apparatus of claim 6 further comprising:
a cable winch attached to the wire rope;
a spring disposed between the jam nut and the grippers for providing a load to the grippers when the grippers are in the first position; and
wherein the slitter comprises four blades and abuts the first end of the expander at a spherical joint.

8. The apparatus of claim 1 wherein the pipe puller assembly is fused to the replacement pipe.

9. The apparatus of claim 1 wherein the slitter abuts the first end of the expander at a spherical joint.

10. The apparatus of claim 1 wherein the slitter comprises four blades.

11. The apparatus of claim 1 wherein the expander further comprises a spring disposed between the jam nut and the gripper for providing a load to the gripper when the gripper is in the gripping position.

12. The apparatus of claim 1 further comprising a swivel holt, wherein the swivel bolt is disposed within the jam nut and the clevis such that the clevis may rotate relative to the jam nut.

13. The apparatus of claim 1 wherein the jam nut is connected to the contact section by threads such that threading the jam nut to the contact section causes the grippers to move to the gripping position.

14. A method comprising:
placing a wire rope through the existing pipe;
disposing a slitter about the wire rope at a first end of the existing pipe;
disposing an expander about the wire rope at a first end of the existing pipe, the expander comprising a tapered section, a jam nut, and a gripper, wherein the gripper is disposed between the jam nut and the tapered section;
attaching the wire rope to the expander by moving the gripper to a gripping position by moving the jam nut toward the tapered section;
pulling the wire rope, slitter, and expander through the existing pipe from the first end to a second end;
slitting the existing pipe with the slitter as the wire rope is pulled; and
expanding the slit existing pipe with the expander as the wire rope is pulled.

15. The method of claim 14 further comprising:
moving the jam nut away from the tapered section after the wire rope is pulled through the existing pipe; and
removing the expander and slitter from the wire rope.

16. The method of claim 14 wherein the wire rope is disposed through a center of the slitter and expander.

17. The method of claim 14 further comprising:
attaching the expander to a pipe puller with a clevis and bolt; and
attaching a new pipe to the pipe puller prior to pulling the wire rope through the existing pipe.

18. The method of claim 17 further comprising detaching the new pipe from the pipe puller when the pipe puller is at the second end of the existing pipe.

19. The method of claim 17 wherein each of the slitter, expander, and pipe puller each have one axis of pivotal movement relative to each other.

20. The method of claim 19 wherein the slitter has two axes of pivotal movement relative to the expander.

21. The method of claim 14 further comprising threading a jam nut to the expander to move the gripper to the gripping position.

* * * * *

UNITED STATES PATENT AND TRADEMARK OFFICE
CERTIFICATE OF CORRECTION

PATENT NO.      : 9,566,653 B2                                              Page 1 of 1
APPLICATION NO. : 14/509859
DATED           : February 14, 2017
INVENTOR(S)     : Randa et al.

It is certified that error appears in the above-identified patent and that said Letters Patent is hereby corrected as shown below:

In the Claims

Column 4, Claim 1, Line 65, after "is" insert --in--.

Signed and Sealed this
Twenty-eighth Day of March, 2017

Michelle K. Lee
*Director of the United States Patent and Trademark Office*